(12) United States Patent
Heppenstall et al.

(10) Patent No.: US 7,225,274 B2
(45) Date of Patent: May 29, 2007

(54) METHOD AND APPARATUS FOR TRANSFERRING DATA ACROSS A PROTOCOL BRIDGE

(75) Inventors: Mark F. Heppenstall, Fremont, CA (US); Micheal Moretti, Saratoga, CA (US); Thomas Wu, Pleasanton, CA (US)

(73) Assignee: Applied Micro Circuits Corporation, San Diego, CA (US)

( * ) Notice: Subject to any disclaimer, the term of this patent is extended or adjusted under 35 U.S.C. 154(b) by 845 days.

(21) Appl. No.: 10/445,108

(22) Filed: May 23, 2003

(65) Prior Publication Data

US 2005/0015515 A1    Jan. 20, 2005

(51) Int. Cl.
*G09F 15/16* (2006.01)
(52) U.S. Cl. ...................................... 709/249
(58) Field of Classification Search ............. None
See application file for complete search history.

(56) References Cited

U.S. PATENT DOCUMENTS 6,889,286 B2*  5/2005  Hino et al. ................. 711/114
6,895,461 B1*  5/2005  Thompson ................. 710/305
7,076,605 B1*  7/2006  Son ............................ 711/113
7,080,190 B2*  7/2006  Weber ....................... 710/315
7,103,694 B2*  9/2006  Schumacher et al. ....... 710/300
2002/0056018 A1*  5/2002  Schumacher et al. ....... 710/300
2004/0139168 A1*  7/2004  Tanaka et al. .............. 709/213
2005/0015535 A1*  1/2005  Lindsay et al. ............. 710/306
2005/0201386 A1*  9/2005  Thompson ............. 370/395.52
2006/0152344 A1*  7/2006  Mowery, Jr. ........... 340/310.11
2006/0246845 A1*  11/2006  Lawson et al. .......... 455/67.11

\* cited by examiner

*Primary Examiner*—Jason Cardone
*Assistant Examiner*—Thomas Duong
(74) *Attorney, Agent, or Firm*—Law Office of Gerald Maliszewski; Gerald Maliszewski

(57) ABSTRACT

A method and apparatus for transferring data across a network protocol bridge is disclosed. In one embodiment, a multi-processing engine configuration is used wherein processing engines are tasked with carrying out specific data transfer operations. In another embodiment, this multi-processing engine configuration is implemented in a protocol bridge in which data is being transferred between Fibre Channel and a network bus that is coupled to a host system. In one embodiment, the network bus is a PCI/PCI-X bus.

16 Claims, 6 Drawing Sheets

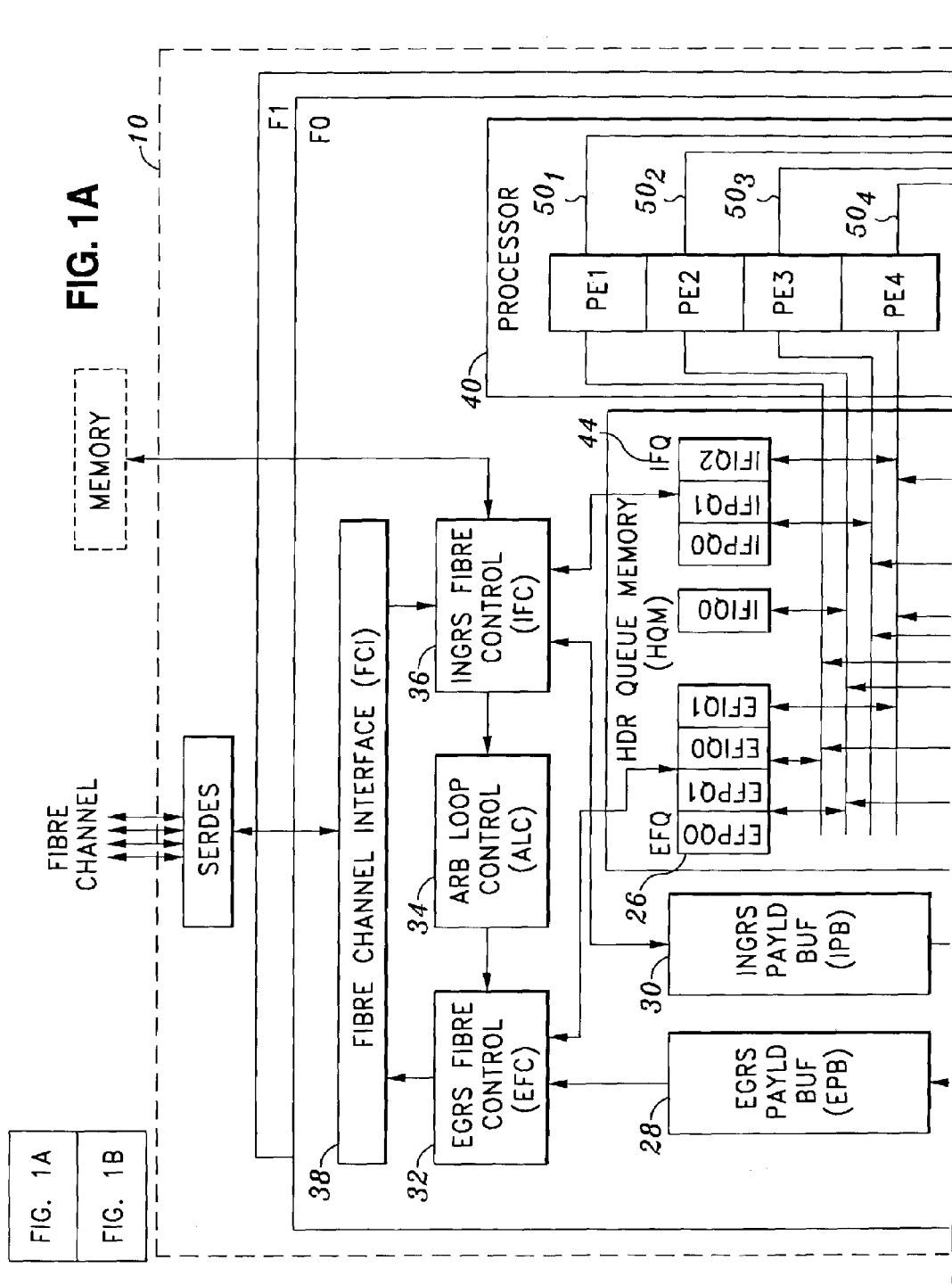

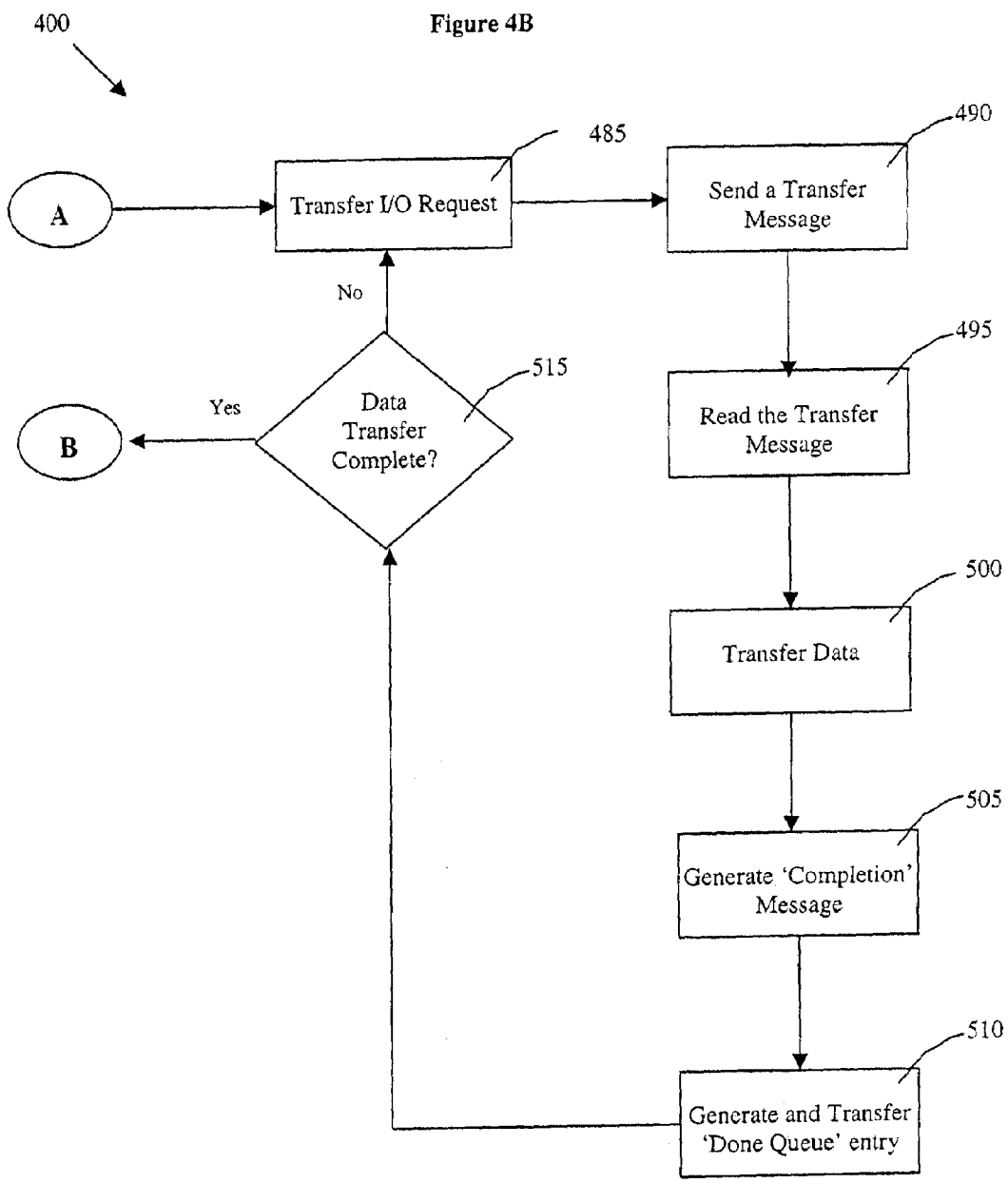

US 7,225,274 B2

METHOD AND APPARATUS FOR TRANSFERRING DATA ACROSS A PROTOCOL BRIDGE

BACKGROUND OF THE INVENTION

1. Field of the Invention

The present invention relates in general to data networks and more particularly, to a method and apparatus for transferring data across a protocol bridge.

2. Background Information

Fibre Channel is a computer communications protocol designed to provide for higher performance information transfers. Fibre Channel allows various existing networking protocols to run over the same physical interface and media. In general, Fibre Channel attempts to combine the benefits of both channel and network technologies.

A channel is a closed, direct, structured, and predictable mechanism for transmitting data between relatively few entities. Channels are commonly used to connect peripheral devices such as a disk drive, printer, tape drive, etc. to a workstation. Common channel protocols are Small Computer System Interface (SCSI) and High Performance Parallel Interface (HIPPI).

Networks, however, are unstructured and unpredictable. Networks are able to automatically adjust to changing environments and can support a larger number of connected nodes. These factors require that much more decision making take place in order to successfully route data from one point to another. Much of this decision making is done in software, making networks inherently slower than channels.

Fibre Channel has made a dramatic impact in the storage arena by using SCSI as an upper layer protocol. Compared with traditional SCSI, the benefits of mapping the SCSI command set onto Fibre Channel include faster speed, connection of more devices together and larger distance allowed between devices. In addition to using SCSI, several companies are selling Fibre Channel devices that run Internet Protocol (IP).

Fibre Channel continues to expand into the storage markets, which will make use of its benefits over traditional channel technologies such as SCSI. Being able to access mass storage devices quicker and from greater distances is very attractive to such applications as multimedia, medical imaging, and scientific visualization. One of the issues with transferring data across a protocol bridge, such as a bridge between Fibre Channel and a peripheral component interconnect (PCI) bus operating in accordance with the PCI-X standard, which is commonly referred to in the art as a PCI-X bus, is the lack of available bandwidth afforded by prior art systems. Thus, there is a need for an improved system of data transfer in which bandwidth is maintained.

SUMMARY OF THE INVENTION

An apparatus and methods for bridging a first network to at least a second network are disclosed. One method comprises coupling a first network interface to a first network, where the first network has a first network protocol, and coupling a second network interface to a second network, where the second network has a second network protocol that is different from the first network protocol. The method further comprises servicing data transmission requests from the second network using a first processing engine, managing data flow from the second network to the first network using a second processing engine, managing data flow from the first network to the second network using a third processing engine, and providing bus command management using a fourth processing engine.

Other embodiments are disclosed and claimed herein.

BRIEF DESCRIPTION OF THE DRAWINGS

FIGS. 1A-1B illustrates a block diagram of one embodiment of an ASIC capable of carrying out one or more aspects of the present invention.

FIGS. 4A-4B are flow diagrams for one embodiment of a Target read/write operation consistent with the principles of the invention.

DETAILED DESCRIPTION

One aspect of the invention is to provide an improved protocol bridge for transferring data. In one embodiment, the protocol bridge transfers data between a protocol-specific network (e.g., Fibre Channel) and a host system on a network bus. In one embodiment, the network bus is a bus compatible with both PCI and PCI-X standards, which is commonly referred to in the art as a PCI/PCI-X bus.

Another aspect of the invention involves the use a multi-processing engine configuration in which specific processing engines are tasked with carrying out specific data transfer operations. In one embodiment, data transfer operations are distributed among four on-chip processing engines. In one example, task distribution is set up as follows: a first processing engine may be dedicated to servicing data transmission requests from the host system. A second processing engine may then be dedicated to managing data flow from the host system to the fibre channel. A third processing engine may be used to manage data flow to the host system from the fibre channel. Finally, a fourth processing engine may be dedicated to bus command management.

Yet another aspect of the invention is to provide inter-processing engine communication using an inter-locked shared memory. In one embodiment, the shared memory may be comprised of firmware queues, while in another embodiment it may be comprised of SDRAM. However, it should further be appreciated that any other memory format capable of providing inter-processing engine communication functionality may similarly be used.

I. System Overview

Figure 1B:
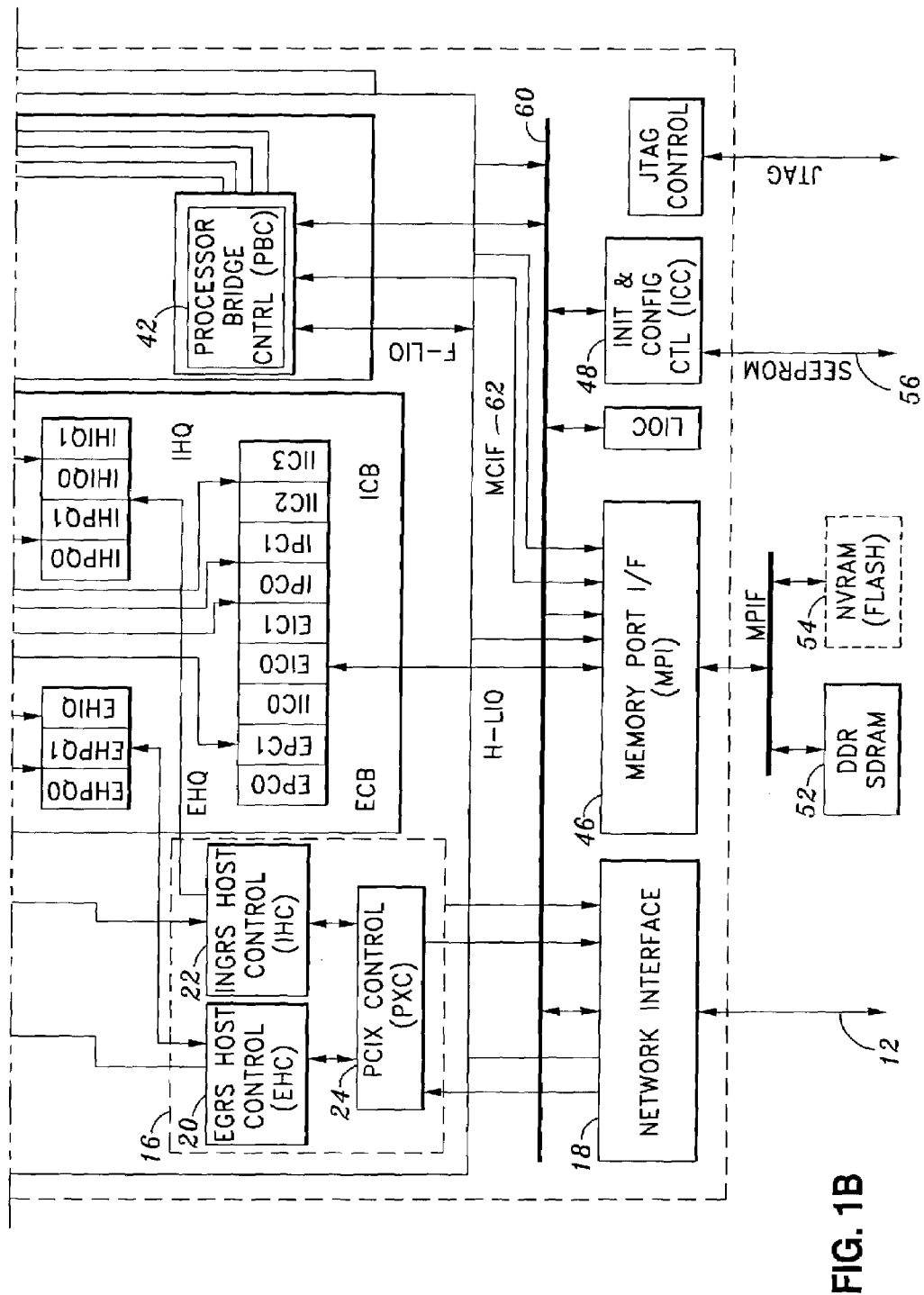

In one embodiment, the invention may be implemented using an ASIC design. To that end, FIGS. 1A-1B illustrate a block diagram of one embodiment of an ASIC 10 capable of carrying out one or more aspects of the present invention. In the embodiment of FIGS. 1A-1B, the ASIC 10 includes two Fibre Channel (FC) ports, F0 Port and F1 Port, with hardware associated with the F0 Port residing on the F0 function level and hardware associated with the F1 Port residing on the F1 function level. It should be appreciated, however, that there may be more or fewer FC ports and one or more of the hardware components for different FC functions may be integrated onto the same function level.

Ingress and Egress references in FIGS. 1A-1B describe the data path direction between a Network Bus 12 (e.g., PCI/PCI-X bus) and one or more Fibre Channel(s) 14, where the Ingress path refers to data supplied by the Fibre Channel(s) 14 to the Network Bus 12 and the Egress path refers to data supplied by the Network Bus 12 to the Fibre Channel(s) 14. While in one embodiment the Network Bus 12 is a POI/PCI-X bus, it should equally be appreciated that the Network Bus 12 may be any other type of bus, such as those operated in accordance with PCI Express and InfiniBand standards. In another embodiment, the Network Bus 12 couples a host system to the ASIC 10, where the host system may be a personal computer, a server, etc.

In the embodiment of FIGS. 1A-1B, ASIC 10 is comprised of four major components—a Host Interface, a Fibre Channel Interface, a Payload Buffer and a Processor Subsystem, all of which will be described in detail below.

A. Host Interface

The Host Interface provides the interface and control between the ASIC 10 and a host system (not shown) coupled to the Network Bus 12. In the embodiment of FIGS. 1A-1B, the Host Interface is comprised of the Host Control Module 16 and the Network Interface 18.

Where the Network Bus 12 is a PCI/PCI-X bus, the Host Interface may further house PCI/PCI-X input staging registers and output sub-phases registers (not shown). The Host Interface may also contain the PCI/PCI-X master and target state machines in order for the ASIC 10 to function as a bus master or a target device on a PCI/PCI-X bus. PCI Configuration Space registers may also be included to support various additional features.

The Host Control Module 16 is comprised of the Egress Host Control (EHC) 20, the Ingress Host Control (IHC) 22, and the Network Bus Control (PXC) 24, according to one embodiment. In the embodiment of FIG. 1, the Host Control Module 16 has the following DMA/queue controllers available to it from the Header Queue Memory (HQM) 26:

EHPQ0—Egress Host Pass-Through Queue 0,
EHPQ1—Egress Host Pass-Through Queue 1,
EHIQ—Egress Host Internal Queue,
IHPQ0—Ingress Host Pass-Through Queue 0,
IHPQ1—Ingress Host Pass-Through Queue 1,
IHIQ0—Ingress Host Internal Queue, and
IHIQ1—Ingress Host Internal Queue.

In another embodiment, most of these DMA controllers will also have separate scatter/gather fetch DMA controllers which assist in bringing in new scatter/gather lists and continuing scatter/gather element processing on its own without processor intervention.

The EHC module 20 may be used to provide read functionality as a bus master to transfer data from the Network Bus 12 (which may originate from the host system's memory) to the Egress Payload Buffer (EPB) module 28 or to the Egress Host Queue (EHQ) memories. In one embodiment, the Egress Host Pass-Thru Queue 0 (EHPQ0), Egress Host Pass-Thru Queue 1 (EHPQ1) and/or Egress Host Internal Queue (EHIQ) registers are programmed with data and control information prior to each read operation.

As shown in the embodiment of FIGS. 1A-1B, the EHQ Memory may be divided into three separate queues (i.e., EHPQ0, EHPQ1 and EHIQ). In one embodiment of a DMA operation, the EHQ memory is used as the common shared memory and the main communication bridge between processor 40 and the Host Control Module 16.

The IHC module 22 may be used to provide the DMA write function as a bus master to transfer data to the Network Bus 12 host memory from the Ingress Payload Buffer (IPB) module 30 or the Ingress Host Queue (IHQ) memory. In one embodiment, the Ingress Host Pass-Thru Queue 0/1 (IHPQ0/1) or Ingress Host Internal Queue 0/1 (IHIQ0/1) registers are programmed with data and control information prior each DMA write operation. In another embodiment, the IHQ memory is used as the common shared memory and a communication bridge between the embedded processor 40 and the Host Control Module 16.

As shown in the embodiment of FIGS. 1A-1B, the IHQ memory may be divided into 4 sections, IHPQ0, IHPQ1, IHIQ0 and IHIQ1.

B. Fibre Channel Block

The Fibre Channel block provides the interface and control between the Fibre Channel and the ASIC 10. In the embodiment of FIGS. 1A-1B, the Fibre Channel block consists of 4 major modules—the Egress Fibre Channel Control (EFC) 32, Arbitrated Loop Control (ALC) 34, Ingress Fibre Channel Control (IFC) 36 and Fibre Channel Interface (FCI) 38 modules.

1. EFC Module

In one embodiment, the EFC module 32 provides the frame flow control mechanism of the FC transmitting port (i.e., F0 or F1). Other operations which may be performed by the EFC module 32 include frame assembly, CRC generation, and retransmission of certain data from the ALC module 34 (e.g., L_Port data). In one embodiment, the EFC module 32 assembles and transmits frames to the FCI module 38 based on the data from Egress Fibre Channel Pass Through Queues (EFPQ0, EFPQ1), Egress Fibre Channel Internal Queues (EFIQ0, EFIQ1), Egress Payload Buffer (EPB), and data from the ALC module 34.

When transmission of internally generated frames is required, the EFC module 32 may control the ALC 34 module's Loop Port State Machine (LPSM) to arbitrate, open and close the loop in order to complete the frame transmission. The EFC module 32 may also provide registers needed to control and to read the state of the status pins of external GBIC and SERDES devices.

In order to prevent memory access collision between the processor 40 and the EFC module 32, a control bit may be defined in each queue element. For example, after power-on-reset, the control bit in each queue element may be initialized to zero before the EFPQ0/1 and EFIQ0/1 Queue Memory state machines are enabled. After a queue element has been programmed by the processor 40 with appropriate information for the EFC module 32 to transmit a frame or frames, control bit of the queue element may be set by the processor 40 to indicate that the ownership of the queue element has been released to the EFC module 32, according to one embodiment.

Once the EFC module 32 has detected that the control bit is being set in this queue element, it may then copy data in the queue element into its own local registers to start the frame transmission process. After the frame transmission process is completed, the EFC module 32 may update the header fields and status in the same queue element location in the queue memory, and release the queue element back to the processor 40 by clearing the control bit. In one embodiment, once the processor 40 detects that the control bit has been cleared, it saves all necessary data from the queue element into its data RAM (e.g., DDR/SDRAM 52). If an error has occurred during the processing of a queue element, the EFC 32 queue memory state machine may be halted on the queue of the given element. The processor 40 may then take appropriate error recovery actions and re-enable the queue process after the error recovery actions are complete.

2. ALC Module

In the embodiment of FIGS. 1A-1B, the ALC module 34 is located between the IFC module 36 and EFC modules 32. This module consists primarily of a Loop Port State Machine (LPSM) whose main function is to continuously monitor data stream coming from the IFC module 36. The LPSM may further be used to monitor commands from the processor 40 and the EFC 32. In one embodiment, the EFC 32 may send a command to the LPSM which defines the function to be performed by the ALC 34 such as loop arbitration, open loop, close loop, etc. In another embodiment, the LPSM may be controlled by the processor 40.

In one embodiment, the ALC module 34 is able to detect different primitive signals or sequences (e.g., LIP, LPE, LPB, MRK, NOS, OLS, LR and LRR) and respond accordingly. In the loop topology, data from the IFC module 36 may be either passed on to the EFC module 32, or substituted with a primitive sequence depending on the function to be performed. The substitution may be either by the state machine itself or signaled from the EFC module 32.

3. IFC Module

The IFC module 36 receives a data stream from the Fibre Channel Interface (FCI) module 38 and provides functions that may include frame disassembling, frame header matching and routing, primitive signal and sequence detection, CRC checking and link interface integrity measurement. In one embodiment, the data received from the FCI module 38 is passed on to the ALC module 34 for retransmission during a private/public loop (L_Port) monitoring state. When not in the monitoring state, each frame received may be examined and routed to the appropriate destination modules. If external memory 43 (e.g., QDR SRAM) is available, each frame received may be stored, and at the same time, the data in the external memory 43 read in. In another embodiment, frame headers are routed to either the IFPQ0/1 or IFIQ0/1/2 memory. If there is a payload in the frame, the payload may be written into the next available buffer segment in the IPB module 30, according to one embodiment. A certain amount of the payload can also be stored in the IFPQx or IFIQx memory along with the frame header for early and fast access of the payload by the processor 40 before the whole frame is received.

In another embodiment, in order to prevent memory access collision between the processor 40 and the IFC 36, a control bit may be defined in each queue element as the queue element ownership token bit between the IFC 36 and the processor 40. For example, when a queue element is released by the processor 40 to receive a frame, the control bit of the queue element is set by the processor 40 to indicate that the ownership of the queue element has been released. When a frame is received, the IFC 36 may check the control bit to make sure of the ownership of this queue element. The IFC 36 may then copy the header into its own local registers and into the queue element. The header may also be compared against the header of the last frame received in the same queue, according to another embodiment. After the frame reception is completed either with or without errors, the IFC 36 may then update the status in the same queue element, and release the queue element back to the processor 40 by clearing the control bit.

When a frame is received and routed into either the pass-thru or internal queue, it may be written into the queue element allocated for this frame. The header of the received frame may also be compared against the last frame received in the same queue to see if this frame is the continuation of the last frame. The result of the comparison may then be stored in one or more registers.

Once the processor 40 detects that the control bit is cleared, it may then check a status field in the queue element to determine if any additional processing of the frame is required. Moreover, any desired information in the queue element may be saved to its Data RAM. Finally, the control bit may be set by the processor 40 to complete the queue element process, after which the queue element would be ready for next the frame.

C. Payload Buffer

The Payload Buffer block is comprised of the Egress Payload Buffer (EPB) 28 and Ingress Payload Buffer (IPB) 30 modules which may be used to provide up to a certain amount of storage (e.g., 16 Kbytes) for payload data as it flows between the Fibre Channel link and the Network Bus 12. To achieve constant streaming of data, the buffer may be implemented using a dual-ported RAM. The buffer can be segmented to reduce latency by allowing a segment to be filled by the write block, while another segment is being emptied by the read block.

D. Processor Subsystem

The Processor Subsystem consists of processor 40, Processor Bridge Controller (PBC) 42, Head Queue Memory (HQM) 44, Memory Port Interface (MPI) modules 46, and Initialization and Configuration Control (ICC) module 48.

1. Processor

In the embodiment of FIGS. 1A-1B, processor 40 includes embedded processing engines PE1, PE2, PE3 and PE4. While in one embodiment, the embedded processing engines (PE1, PE2, PE3, and PE4) are little-endian, 5-stage pipeline, high-performance, 32-bit RISC cores, it should equally be appreciated that other processor/engine configurations may be employed. For example, the embedded processing engines may similarly be comprised of one or more MIPS processors. Moreover, while the embodiment of FIGS. 1A-1B depicts four processing engines, it should similarly be appreciated that more or fewer processing engines may be used.

The PBC module 42 provides the interfaces that connects the embedded processing engines PE1-PE4 to the rest of the ASIC 10 hardware. Each embedded processing engine PE1-PE4 may have a bus (shown in FIG. 1A as buses $50_1$-$50_4$) that is used to interface to the rest of the ASIC 10 through the PBC module 42. In one embodiment, buses $50_1$-$50_4$ are general purpose I/O buses that support burst reads and pipelined single-access writes. In another embodiment, the processing engines PE1-PE4 can also use buses $50_1$-$50_4$ to interface with external memory devices such as DDR/SDRAM 52 and NVRAM 54 attached to the ASIC 10 through the MPI module 46, or SEEPROM 56 through the ICC module 48. In yet another embodiment, the PBC module 42 may also provide bi-directional bridging between the F_LIO 58 and Host Local I/O (H_LIO) bus 60. In one embodiment, F_LIO 58 may be used to provide access to registers in other hardware blocks through arbitration.

In addition to providing interfaces for various busses, the PBC module 42 may also provide one or more of the following functions: Host Delivery Queues are provided to allow external hosts to post PCI addresses of new commands in the host memory to be processed by the ASIC 10; a plurality of "Done Queue" logics are provided to allow proper handshakes between processors and external hosts, and to control PCI interrupt generation; firmware queue registers are provided to allow processors to pass messages between them; different types of timers are provided for various purposes possibly including real time clocks and programmable timers; and message passing registers which allow processors to pass and receive messages to and from external hosts.

2. HQM Module

The HQM module 44 provides high-speed dual-port memory modules. Memory modules may serve a specific function and be grouped into a particular interface, such as Host, FC and MPI. Within each interface, the memory modules may further be divided into Egress or Ingress data flow direction, and also into pass-through and internal.

In one embodiment of an I/O operation, the processing engines PE1-PE4 are running with the firmware to process incoming and outgoing frames. The HQM module 44 may serve as the common shared memory that is used as the main communication bridge between the embedded processing engines PE1-PE4 and the hardware where both have direct random access.

As shown in the embodiment of FIGS. 1A-1B, PE1 has the following four queue memories: EHIQ, EFIQ0, EIC0 and EIC1. PE2 has eight different queue memories including: EHPQ0, EHPQ1, EFPQ0, EFPQ1, EPC0, EPC1, IFIQ0 and IIC0. In turn, the PE3 depicted in the embodiment of FIGS. 1A-1B has queue memories IHPQ0, IHPQ1, IFPQ0, IFPQ1, IPC0 and IPC1. Finally, PE4 is depicted with queue memories EFIQ1, IFIQ2, IHIQ0, IHIQ1, IIC2 and IIC3.

3. Memory Port Interface (MPI) Module

The MPI module 46 may be used to provide arbitrated accesses to external memory (e.g., DDR/SDRAM 52 and/or NVRAM 54) devices by the embedded processing engines PE1-PE4, as well as to every bus master on the internal H_LIO bus 60. In one embodiment, the embedded processing engines PE1-PE4 can access external memory via three mechanisms—the Context Cache Interface (CCIF) 61, the Memory Control Interface (MCIF) 62 or the H_LIO bus 60.

4. Initialization and Configuration Control Module (ICC)

In one embodiment, the ICC 48 includes a Serial Memory Control (SMC) module, which can be used to initialize internal registers and provide read/write access to SEEPROM 56. The ICC 48 may also include a Trace Control module to provide external visibility of the internal signals.

II. Processing Engine Implementation

Figure 2:
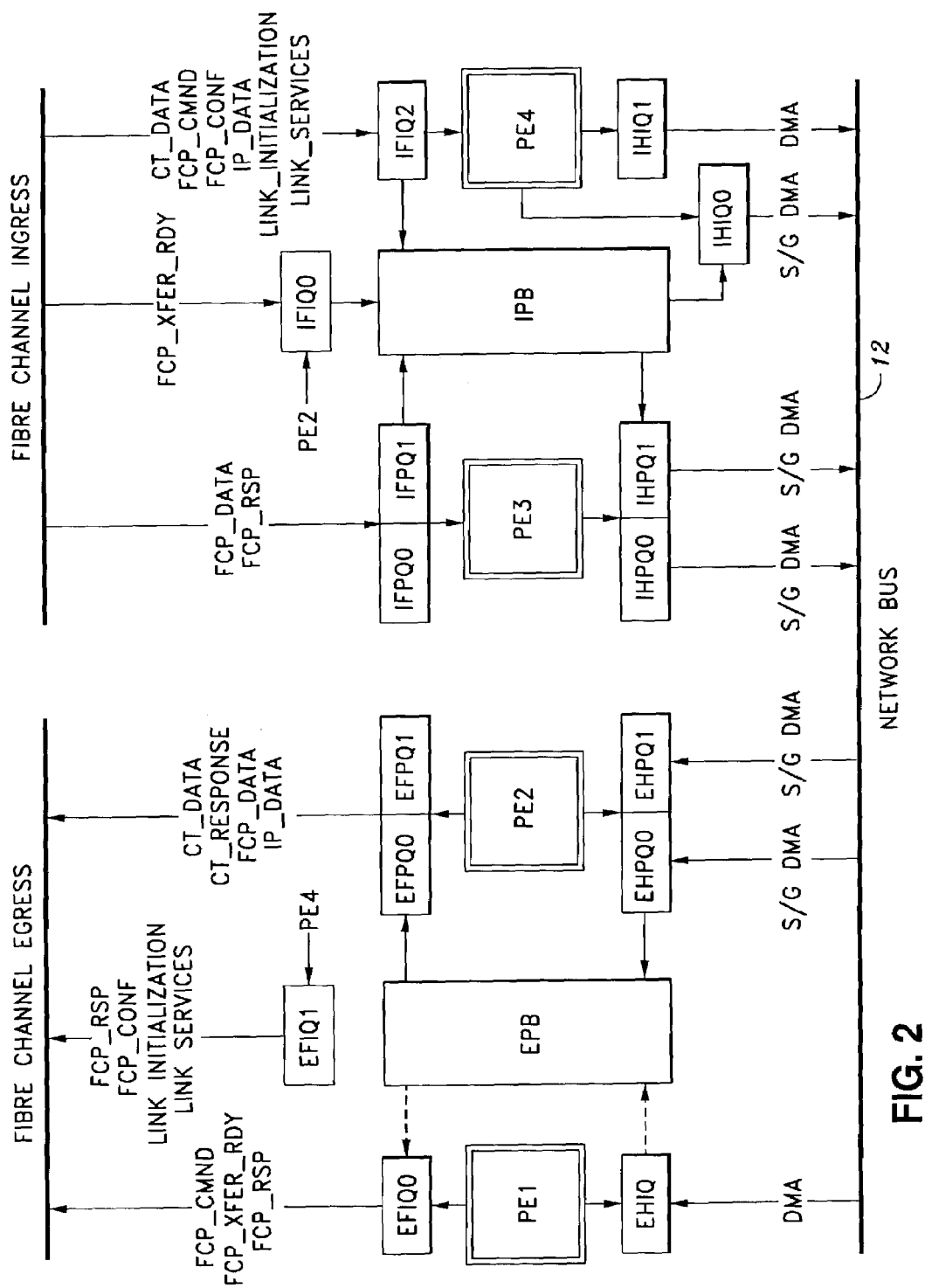
FIG. 2 depicts a configuration of the processing engines for the ASIC of FIGS. 1A-1B, according to one embodiment.

As discussed above in Section I.D, processing engines PE1-P4 may be connected to the rest of the ASIC 10 through the PBC module 42. Referring now to FIG. 2, in which one embodiment of the processing engines PE1-PE4 firmware flow is depicted. In particular, in the embodiment of FIG. 2, PE1 may be used to service I/O requests and control information from the host system to the ASIC 10 over Network Bus 12. PE1 may also initiate FC protocol commands (FCP_CMND) and other FC functions, such as Transfer Readys (FCP_XFER_RDY) and FCP Responses (FCP_FRSP). In one embodiment, PE1 may also generate requests for PE2 to send data on the Fibre Channel Egress. Moreover, PE1 may also be used to pass host system resource contexts to PE4.

In the embodiment of FIG. 2, PE1 has access to EFIQ0 and EHIQ, which may operate in lockstep for host system I/O request processing. Header queue pointers may be used to maintain the I/O request processing from the host. By way of example only, the queue pointer $EHIQ_{New}$ may be used to point to the next EHIQ element that is available to receive an I/O request from the host, while the queue pointer $EXIQ_{Ptr}$ may point to the EHIQ element that is awaiting host DMA completion and the next EFIQ0 element available for egress Fibre Channel. In addition, a third queue pointer (e.g., $EFIQ0_{Comp}$) may be used to point to the EFIQ0 element that is possibly awaiting completion on egress Fibre Channel. A firmware flag in the header queue element may be used to provide control throughout these operations.

Continuing to refer to FIG. 2, PE2 may be used to manage data flow from the host system (vis the Network Bus 12) and transmit such data on fibre. In particular, PE2 may service FCP_XFER_RDY frames on ingress Fibre Channel and generate egress Fibre Channel activity through the host DMA channel. In one embodiment, the sources of egress Fibre Channel requests may come from either FCP_XFER_RDY on IFIQ0 or from the Firmware Queue from PE1. In one embodiment, PE2 may load and lock the I/O context and generate a host system DMA transfer, which provides data to send out on the Fibre Channel. Once the data has been transmitted out on the Fibre Channel, the I/O context may then be saved to memory and unlocked, according to one embodiment.

In the embodiment of FIG. 2, Ingress Fibre Channel processing uses a single header queue pointer for managing IFIQ0. This queue pointer (e.g., $IFIQ_{New}$) may be used to point to the next IFIQ0 element that contains a FCP_XFER_RDY frame received on the ingress Fibre Channel. After the frame has been validated, a request may be placed on a firmware queue for processing by the egress Fibre Channel section of PE2. This mechanism provides asynchronous operation between the ingress and egress sections of the PE2 processing operations, according to one embodiment.

Egress processing requests may come from either the firmware queue from PE1 or the internal firmware queue from PE2. For example, requests from PE1 may be requests for FCP data (FCP_DATA), Common Transport data (CT_DATA), a Common Transport response (CT_RESPONSE), or IP data (IP_DATA). Similarly requests from PE2 may include a FCP_XFER_RDY request.

In the embodiment of FIG. 2, the EHPQ0/1 and EFPQ0/1 element indexes may operate in lockstep for each egress request processed. Header queue pointers may be used for processing egress requests. For example, queue pointers (e.g., $EXPQ0_{New}$/$EXPQ1_{New}$) may be used to point to the next EHPQ0/1 element that is available for initiating a DMA transfer from the host and the next EFPQ0/1 element available for the egress Fibre Channel. Similarly, queue pointers (e.g., $EXPQ0_{Comp}$/$EXPQ1_{Comp}$) may point to the EHPQ0/1 element that is awaiting host DMA completion and the EFPQ0/1 element that is awaiting completion on the egress Fibre Channel. A firmware flag may be maintained in the header queue element to provide control throughout these operations.

Continuing to refer to FIG. 2, PE3 may be used to manage data flow to the host system for data that is received on the Fibre Channel. In particular, PE3 may service FCP_DATA and FCP_RSP frames on the ingress Fibre Channel and generate DMA transfers to the host. In one embodiment, the serviceable events for PE3 include: FCP data or FCP response events received on IFPQ0/1, host DMA completions on IHPQ0/1, and I/O Context fetching completions. In another embodiment, for FCP_DATA frames received, PE3 may load and lock the I/O context and transfer the Fibre Channel data to the host system using a DMA operation. When all the data has been received on Fibre Channel, the I/O context may be saved to memory (e.g., SDRAM) and unlocked, according to one embodiment. For FCP_RSP frames received, PE3 may load and lock the I/O context and send a 'completion' message to PE4 using a firmware queue. Thereafter, the I/O context may be unlocked.

In one embodiment, the IFPQ0/1 and IHPQ0/1 element indexes may operate in lockstep for each ingress request processed. In another embodiment, the IHPQ0/1 element may not used when a successful FCP_RSP is received. In such a case, the IHPQ0/1 element may be skipped after processing of the IFPQ0/1 element is complete.

Header queue pointers may be used in processing ingress requests. For example, queue pointers (e.g., $IXPQ0_{New}$/

IXPQ1$_{New}$) may point to the next IFPQ0/1 element available for the ingress Fibre Channel and the next IHPQ0/1 element that is available for initiating a DMA transfer to the host. Similarly, queue pointers (e.g., IHPQ0$_{Comp}$/IHPQ1$_{Comp}$) may be used to point to the IHPQ0/1 element that is awaiting host DMA completion.

PE4 may be used to service the 'completion' firmware queue and provide management of the Fibre Channel link. The receipt of a 'completion' firmware queue message may produce an I/O request completion to the host system over the Network Bus 12. The Fibre Channel link management functions provided by PE4 may include Link Initialization and Link Service Frame Management. Link Initialization may include a set of software algorithms designed to make the link operational as either an N-Port (point-to-point and Fabric Fiber Channel topologies) or an L-Port. After successful link initialization, the Fibre Channel port may have the state of 'Link-Up' and port discovery may begin.

As shown in FIG. 2, PE4 may use the IFIQ2 and IHIQ0 element indexes in lockstep for each ingress request processed. However, the IHIQ0 element need not be used when a Link Initialization frame or Link Service frame is received. In such cases, the IHIQ0 element may be skipped after processing of the IFIQ2 element is complete. As with the other processing engines, header queue pointers may be used for processing ingress requests. A queue pointer (e.g., IXIQ$_{New}$) may point to the next IFIQ2 element that contains a Link Initialization frame, Link Service frame, CT_DATA, IP_DATA or FCP_CMND received on the ingress Fibre Channel. In one embodiment, after a frame has been validated, an IHIQ0 element may be generated for CT_DATA, IP_DATA, and FCP_CMND. Similarly, an EFIQ1 element may be generated for Link Service processing or Link Initialization. A queue pointer (e.g., IXIQ$_{New}$) may also be used to point to the next IHIQ0 element that is available for initiating a DMA transfer to the host. Moreover, a queue pointer (IHIQ0$_{Comp}$) may also be used to point to the IHIQ element that is awaiting host DMA completion. In another embodiment, when the IHIQ0 host transfer is complete, a queue entry may be generated for completion of CT_DATA, IP_DATA or FCP_CMND.

In one embodiment, egress processing requests are generated internally from Link Initialization, Link Service Processing, and Port Discovery. A queue pointer (e.g., EFIQ1$_{New}$) may be used to point to the next EFIQ1 element that is available for initiating the egress Fibre Channel requests. Another queue pointer (e.g., EFIQ1$_{Comp}$) may also be used to point to the EFIQ1 element that is awaiting completion on the egress Fibre Channel. In another embodiment, a firmware flag is maintained in the header queue element to provide control throughout these operations.

By way of providing an example of how processing engines PE1-PE4 may be used to carry out data transfer operations, one embodiment of an Initiator FCP read/write operation and a Target read/write operation will now be described.

Figure 3:
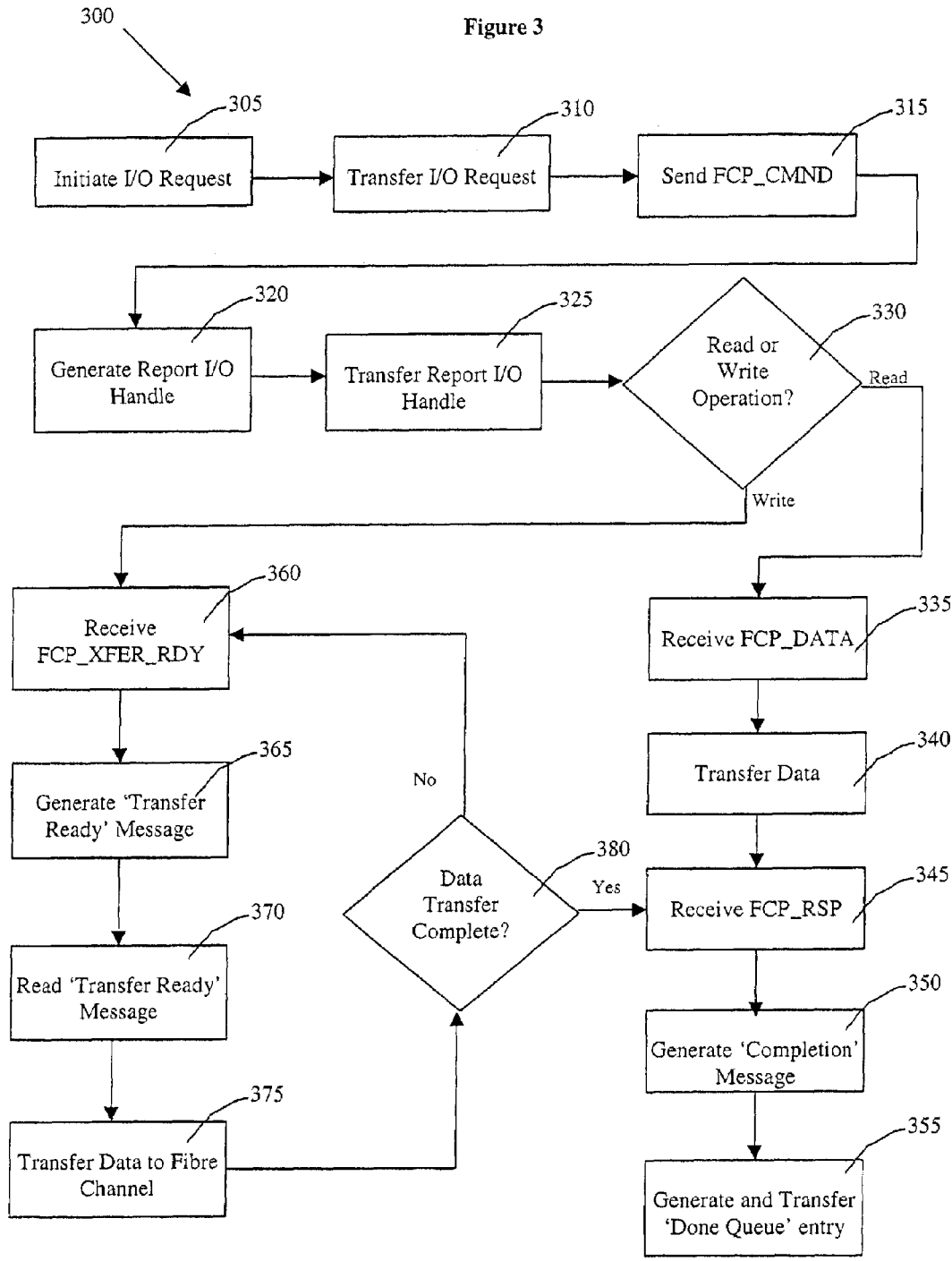
FIG. 3 is a flow diagram for one embodiment of an FCP read/write operation consistent with the principles of the invention.

Referring now to FIG. 3, in which one embodiment of an Initiator FCP read/write operation 300 is described. In the embodiment of FIG. 3, PE1-PE4 are used to carry out the read/write operation. In particular, at block 305 the host system initiates operation 300 by writing the I/O request's address to a Delivery Queue. PE1 may then transfers the I/O request from the host system using EHIQ (block 310). Thereafter, at block 315 PE1 may be used to send the FCP_CMND using EFIQ0. PE1 may then generate a 'Report I/O Handle' message to PE4 (block 320). At block 325, PE4 may transfer the 'Report I/O Handle' data to the host system via Network Bus 12.

If operation 300 is a 'read' operation, then after block 330 the process continues to block 335 where PE3 receives FCP_DATA using IFPQ0/1. PE3 may then transfer the data to the host system using IHPQ0/1 (block 340). At this point, in the embodiment of FIG. 3, PE3 may receive an FCP_RSP using IFPQ0/1 (block 345). At block 350, PE3 generates a 'Completion' message to PE4, after which PE4 generates and transfers the 'Done Queue' entry to the host system using IHIQ1 (block 355).

If, on the other hand, the operation 300 is a 'write' operation then the process continues to block 360 rather than block 335. In particular, at block 360, PE2 receives a FCP_XFER_RDY using IFIQ0. At block 365, PE2 generates a 'Transfer Ready' message to PE2, after which PE2 reads the 'Transfer Ready' message from PE2 (block 370). At this point, PE2 may transfer the data to the Fibre Channel using EHPQ0/1 and EFPQ0/1 (block 375). If the data transfer operation is not complete, operation 300 returns to block 360 until the data transfer operation is complete (block 380). Once the data transfer operation is complete, operation 300 continues to block 345 and continues in the same manner as if it were a 'read' operation.

Figure 4A:
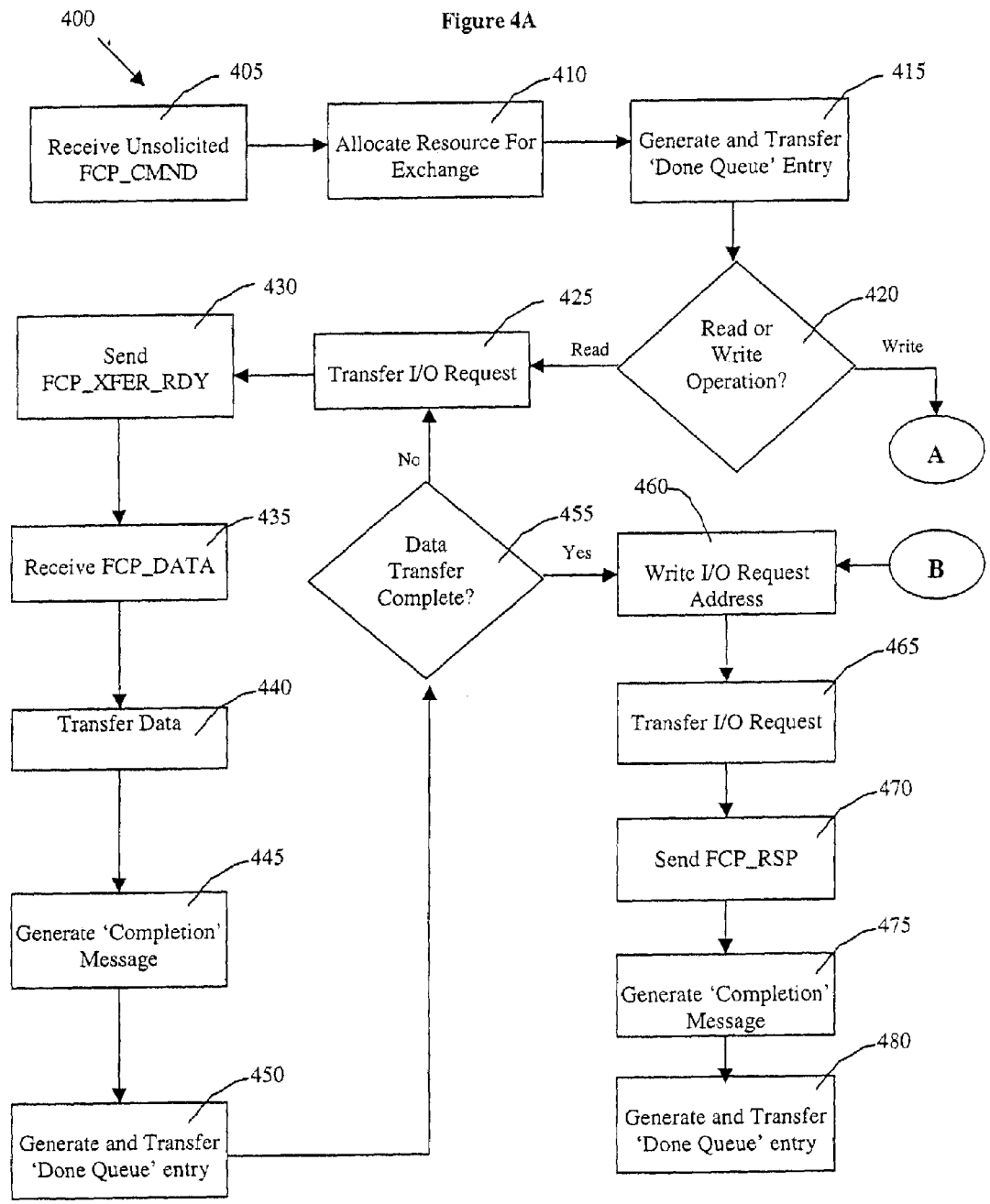

Referring now to FIG. 4A-4B, in which a Target FCP read/write operation 400 is depicted. In the embodiment of FIGS. 4A-4B, processing engines PE1-PE4 are used to carry out the FCP read/write operations.

At block 405, PE4 receives an unsolicited FCP_CMND on IFIQ2, after which PE4 is tasked with allocating an FCP_CMND_RESOURCE for the exchange (block 410). PE4 may then generate and transfer the 'Done Queue' entry to the host system using IHIQ1 at block 415. If operation 400 is a 'read' operation, the process will continue to block 425 where PE1 transfers the I/O request from the host system using EHIQ. Thereafter, PE1 may send the FCP_X-FER_RDY using EFIQ0 (block 430). In the embodiment of FIG. 4A, at block 435 PE3 may then receive FCP_DATA using IFPQ0/1, after which PE3 may transfer the data to the host system using IHPQ0/1 (block 440). Thereafter, at block 445, PE3 generates a 'Completion' message to PE4, which in turn may generate and transfer the 'Done Queue' entry to the host system using IHIQ1 (block 450).

At block 455, a determination is made as to whether the data transfer is complete. If not, operation 400 returns to block 425 and repeats the operations of blocks 430-450 until all data has been transferred. If, on the other hand, the data transfer is complete, operation 400 will continue to block 460 where the I/O request's address is written to a Delivery Queue. PE1 may then transfer the I/O request from the host system using EHIQ (block 465). At block 470, PE1 may send the FCP_RSP using EFIQ0. PE1 may also then generate a 'Completion' message to PE4 (block 475), followed by PE4 generating and transferring a 'Done Queue' entry to the host system using IHIQ1 (block 480).

If, on the other hand, operation 400 was a 'write' operation, then after block 420 the process would continue to A of FIG. 4B. Referring now to FIG. 4B, at block 485 PE1 transfers the I/O request from the host system using EHIQ. Thereafter, PE1 may send a 'Transfer' message to PE2 (block 490), and PE2 may read the 'Transfer' message from PE1 (block 495). In addition, at block 500 PE2 may also transfer the data to the Fibre Channel using EHPQ0/1 and EFPQ0/1. Thereafter, PE2 may generate a 'Completion' message to PE4, and PE4 may generate and transfer the 'Done Queue' entry to the host system using IHIQ1 (block 510). The operations of blocks 485-515 are repeated until the data transfer is complete. At that point, operation 400 continues to block 460 and proceeds in the same manner that a 'read' operation would.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. An apparatus to bridge a first network to at least a second network comprising:
   a first network interface coupled to the first network, said first network having a first network protocol;
   a second network interface coupled to the second network, said second network having a second network protocol that is different from said first network protocol;
   a memory module coupled to said first network interface and said second network interface; and,
   a processor subsystem coupled to said memory module, said processor subsystem comprised of,
      a first processing engine, including a first processor to service data transmission requests from the second network;
      a second processing engine, including a second processor, different from first processor, to manage data flow from the second network to the first network;
      a third processing engine, including a third processor, different from the first and second processors, to manage data flow from the first network to the second network; and
      a fourth processing engine, including a fourth processor, different from the first, second, and third processors, to provide bus command management.

2. The apparatus of claim 1, wherein said first network is fibre channel and said first network protocol is fibre channel protocol, wherein further said second network is a PCI/PCI-X network, which is a network compatible with both peripheral component interconnect (PCI) and PCI-X standards.

3. The apparatus of claim 1, wherein said memory module provides interlocked shared memory for communication between said processing engines.

4. The apparatus of claim 3, wherein said memory module is comprised of a plurality of firmware queues.

5. The apparatus of claim 1, wherein said first processing engine is further to service I/O requests and control information from said second network.

6. The apparatus of claim 1, wherein said first network is fibre channel and said first network protocol is fibre channel protocol, said second processing engine is further to service fibre channel protocol transfer ready frames on ingress fibre channel and generate egress fibre channel activity.

7. The apparatus of claim 1, wherein said first network is fibre channel and said first network protocol is fibre channel protocol (FCP), said fourth processing engine is further to provide fibre channel link management.

8. The apparatus of claim 1, wherein said apparatus further comprises a payload buffer coupled to the memory module and the processor, said payload buffer to be segmented dual-port RAM which allows simultaneous read/write functionality.

9. A method of bridging a first network to at least a second network, the method comprising:
   coupling a first network interface to the first network, said first network having a first network protocol;
   coupling a second network interface to the second network, said second network having a second network protocol that is different from said first network protocol;
   servicing data transmission requests from the second network using a first processing engine, which includes a first processor;
   managing data flow from the second network to the first network using a second processing engine, which includes a second processor, different from the first processor;
   managing data flow from the first network to the second network using a third processing engine, which includes a third processor, different from the first and second processors; and
   providing bus command management using a fourth processing engine, including a fourth processor, different from the first, second, and third processors.

10. The method of claim 9, wherein said first network is fibre channel and said first network protocol is fibre channel protocol, wherein further said second network is a PCI/PCI-X-network, which is a network compatible with both peripheral component interconnect (PCI) and PCI-X standards.

11. The method of claim 9, further comprising providing communication between said processing engines using an interlocked shared memory module.

12. The method of claim 11, wherein said memory module is comprised of a plurality of firmware queues.

13. The method of claim 9, further comprising servicing I/O requests and control information from said second network using said first processing engine.

14. The method of claim 9, wherein said first network is fibre channel and said first network protocol is fibre channel protocol (FCP), the method further comprising servicing FCP transfer ready frames on ingress fibre channel and generating egress fibre channel activity using said second processing engine.

15. The method of claim 9, wherein said first network is fibre channel and said first network protocol is fibre channel protocol (FCP), said fourth processing engine is further to provide fibre channel link management.

16. The method of claim 9, further comprising simultaneously reading and writing frame-based data to a payload buffer using said processing engines, said payload buffer to be segmented dual-port RAM.

\* \* \* \* \*